United States Patent
Choi

[11] Patent Number: 5,495,786
[45] Date of Patent: Mar. 5, 1996

[54] METHOD AND APPARATUS FOR CONTROLLING SCALE PRACTICE OF ELECTRONIC MUSICAL INSTRUMENT

[75] Inventor: Kwang S. Choi, Kyungki-Do, Rep. of Korea

[73] Assignee: Goldstar Co., Ltd., Rep. of Korea

[21] Appl. No.: 159,817

[22] Filed: Nov. 30, 1993

[30] Foreign Application Priority Data

Nov. 30, 1992 [KR] Rep. of Korea .................. 22807/1992

[51] Int. Cl.⁶ ..................................................... G09B 15/00
[52] U.S. Cl. .................. 84/470 R; 84/477 R; 434/307 R
[58] Field of Search ............................ 84/470 R, 477 R, 84/478; 434/227, 307 R

[56] References Cited

U.S. PATENT DOCUMENTS

| 4,281,579 | 8/1981 | Bennett, Sr. .............................. 84/478 |
| 5,183,398 | 2/1993 | Monte et al. .......................... 434/227 |

FOREIGN PATENT DOCUMENTS

| 0085269 | 12/1982 | European Pat. Off. . |
| 2055504 | 7/1979 | United Kingdom . |
| 2113899 | 1/1983 | United Kingdom . |

*Primary Examiner*—Patrick J. Stanzione
*Attorney, Agent, or Firm*—Ostrolenk, Faber, Gerb & Soffen

[57] ABSTRACT

A method and an apparatus for controlling scale practice of an electronic musical instrument. The apparatus includes a function select switching section for selecting a desired one of various functions according to a user's selection. The function select switching section is provided with a scale practice switch, a scale select switch, a minor switch, an increment switch, a decrement switch, a random switch and a note hearing test switch. If the scale practice switch and the scale select switch are selected, sequentially varied scales are displayed on a display unit and one thereof is then selected by the user. The selected scale is displayed on the display unit. A minor or major of the selected scale is set if the minor switch is selected. Tunes with sequentially incremented or decremented notes and randomly varied notes are selected if the increment or decrement switch and the random switch are selected. The selected tunes are displayed on the display unit according to the selected scale. Only when the first one of the notes of the presently displayed tune and a note pushed by the user are the same, the operation proceeds to the next note. A random note is given to the user if the note hearing test switch is selected. The operation proceeds to the next note only when the random note and a note pushed by the user are the same.

5 Claims, 5 Drawing Sheets

C MAJOR
C MINOR

C#MAJOR
C#MINOR

/ 1

METHOD AND APPARATUS FOR CONTROLLING SCALE PRACTICE OF ELECTRONIC MUSICAL INSTRUMENT

BACKGROUND OF THE INVENTION

1. Field of the Invention

The present invention relates in general to electronic musical instruments, and more particularly to a method and an apparatus for controlling scale practice of an electronic musical instrument in which a keyboard form and a sheet music with a note variation are displayed for the scale practice, a pushed note is compared with a displayed note and the compared result is recognized by the user, so that the user can readily perform the scale practice for his self.

2. Description of the Prior Art

Referring to FIG. 1, there is shown a block diagram of a conventional apparatus for controlling scale practice of an electronic musical instrument. As shown in this drawing, the conventional scale practice control apparatus comprises a function select switching section 1 for selecting a desired one of various functions of the electronic musical instrument according to a user's selection, a microprocessor 2 for outputting a control signal to perform the function selected by the function select switching section 1, a display unit 3 for displaying a sheet music of a tune selected according to the control signal from the microprocessor 2, and a keyboard 4 for allowing the user to play the electronic music instrument according to the sheet music displayed on the display unit 3.

The function select switching section 1 includes a scale practice switch 11 for selecting a scale practice mode, increment and decrement switches 12 and 13 for selecting the tune for the scale practice, a start switch 14 for starting the play of the tune selected by the increment and decrement switches 12 and 13, and a stop switch 15 for stopping the scale practice mode.

The microprocessor 2 pre-stores a plurality of tunes for the scale practice.

The operation of the conventional scale practice control apparatus with the above-mentioned construction will hereinafter be described with reference to FIGS. 1 and 2.

FIG. 2 is a flowchart illustrating the operation of the conventional scale practice control apparatus in FIG. 1. First, the microprocessor 2 checks whether the scale practice switch 11 on the function select switching section 1 is pushed by the user. If it is checked that the scale practice switch 11 is pushed by the user, the microprocessor 2 checks whether the increment switch 12 is selected by the user. If it is checked that the increment switch 12 is selected by the user, the microprocessor 2 increments a tune number by one. On the contrary, if it is checked that the increment switch 12 is not selected by the user, the microprocessor 2 checks whether the decrement switch 13 is selected by the user. If it is checked that the decrement switch 13 is selected by the user, the microprocessor 2 decrements the tune number by one. In this manner, the tune is selected for the scale practice.

If the tune for the scale practice is selected as mentioned above, the microprocessor 2 checks whether the start switch 14 is selected by the user. If it is checked that the start switch 14 is selected by the user, the sheet music of the selected tune is displayed on the display unit 3.

Then, the user performs the scale practice by playing the keyboard 4 according to the sheet music displayed on the display unit 3. Upon completion of the selected tune, the operation proceeds to the next tune to perform repeatedly the scale practice.

At that time that the stop switch 15 on the function select switching section 1 is selected by the user, the scale practice is stopped.

However, the above-mentioned conventional scale practice control apparatus has a disadvantage in that the tunes for the scale practice are pre-stored in the microprocessor, resulting in a lack in a variety of the scale practice contents. This results in a reduction in the practice effect. Also, it is impossible to perform a note hearing test.

SUMMARY OF THE INVENTION

Therefore, the present invention has been made in view of the above problems, and it is an object of the present invention to provide a method and an apparatus for controlling scale practice of an electronic musical instrument in which tunes with regular notes and random notes are variously stored in a microprocessor for the scale practice, resulting in an increase in the practice effect.

It is another object of the present invention to provide a method and an apparatus for controlling scale practice of an electronic musical instrument in which it is possible to perform a note hearing test in which a note is first given to the user and it is then checked whether a key on a keyboard pushed by the user corresponds to the note.

In accordance with one aspect of the present invention, there is provided an apparatus for controlling scale practice of an electronic musical instrument, having function select switching means for selecting a desired one of various functions of the electronic musical instrument according to a user's selection, said function select switching means comprising a scale practice switch for selecting a scale practice mode; a scale select switch for selecting a desired scale; a minor switch for selecting a major or minor of the scale selected by said scale select switch; an increment switch for selecting a tune, notes of which are sequentially incremented; a decrement switch for selecting a tune, notes of which are sequentially decremented; a random switch for selecting a tune, notes of which are varied at random; and a note hearing test switch for selecting a note hearing test mode.

In accordance with another aspect of the present invention, there is provided a method of controlling scale practice of an electronic musical instrument, comprising the steps of (a) checking whether a scale practice switch on function select switching means is selected by the user, checking, if it is checked that said scale practice switch is pushed by the user, whether a scale select switch on said function select switching means is selected by the user, varying sequentially scales if it is checked that said scale select switch is selected by the user, displaying the sequentially varied scales on a display unit and displaying one of the sequentially varied scales selected by the user on said display unit; (b) checking after performing said step (a) whether a minor switch on said function select switching means is selected by the user and setting a minor or major of the scale selected at said step (a) if it is checked that said minor switch is selected by the user; (c) checking after performing said step (b) whether an increment or decrement switch and a random switch on said function select switching means are selected by the user, selecting tunes with sequentially incremented or decremented notes and randomly varied notes if it is checked that said increment or decrement switch and said random switch are selected by the user, displaying the selected tunes on said display unit according to the scale selected at said step (b), comparing the first one of the notes of the presently displayed tune with a note on a keyboard pushed by the user and proceeding to the next note only when the first note and the note pushed by the user are the same as a result of the comparison; and (d) checking whether a note hearing test switch on said function select switching means is selected by the user, giving a random note to the user if it is checked that said note hearing test switch is selected by the user, comparing the random note with a note on said keyboard pushed by the user and proceeding to the next note only when the random note and the note pushed by the user are the same as a result of the comparison.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
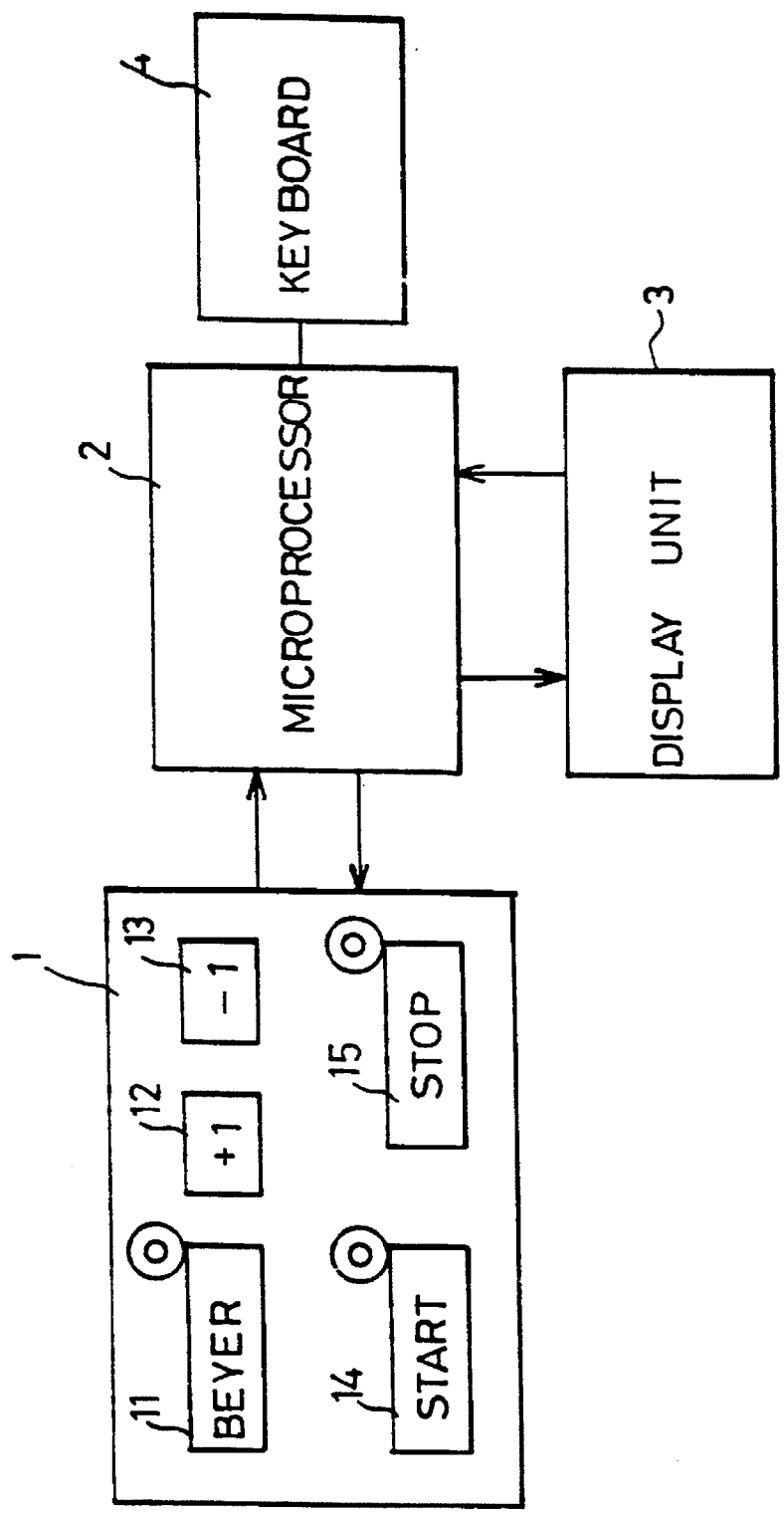
FIG. 1 is a block diagram of a conventional apparatus for controlling scale practice of an electronic musical instrument.
Figure 2:
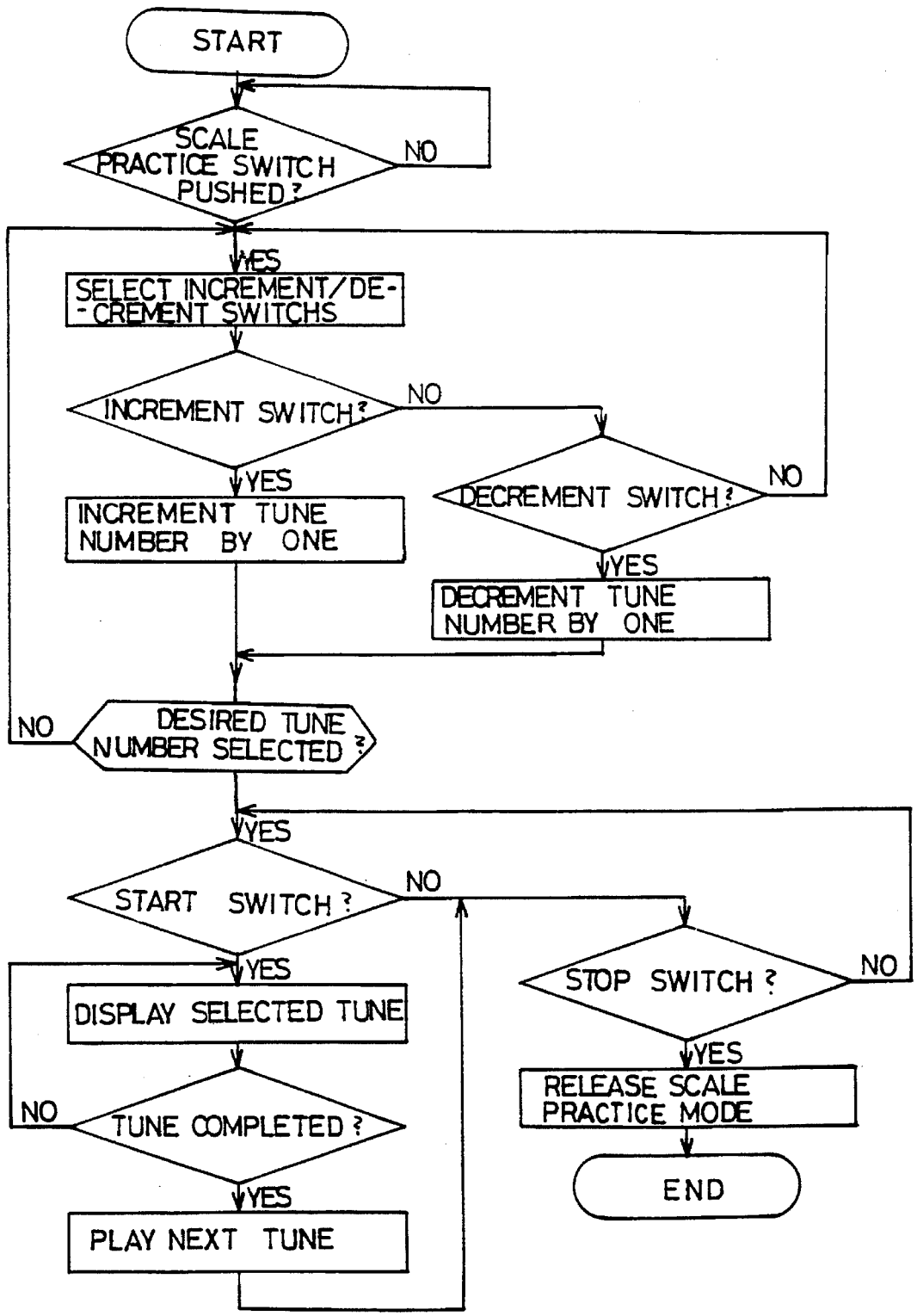
FIG. 2 is a flowchart illustrating the operation of the conventional scale practice control apparatus in FIG. 1.
Figure 3:
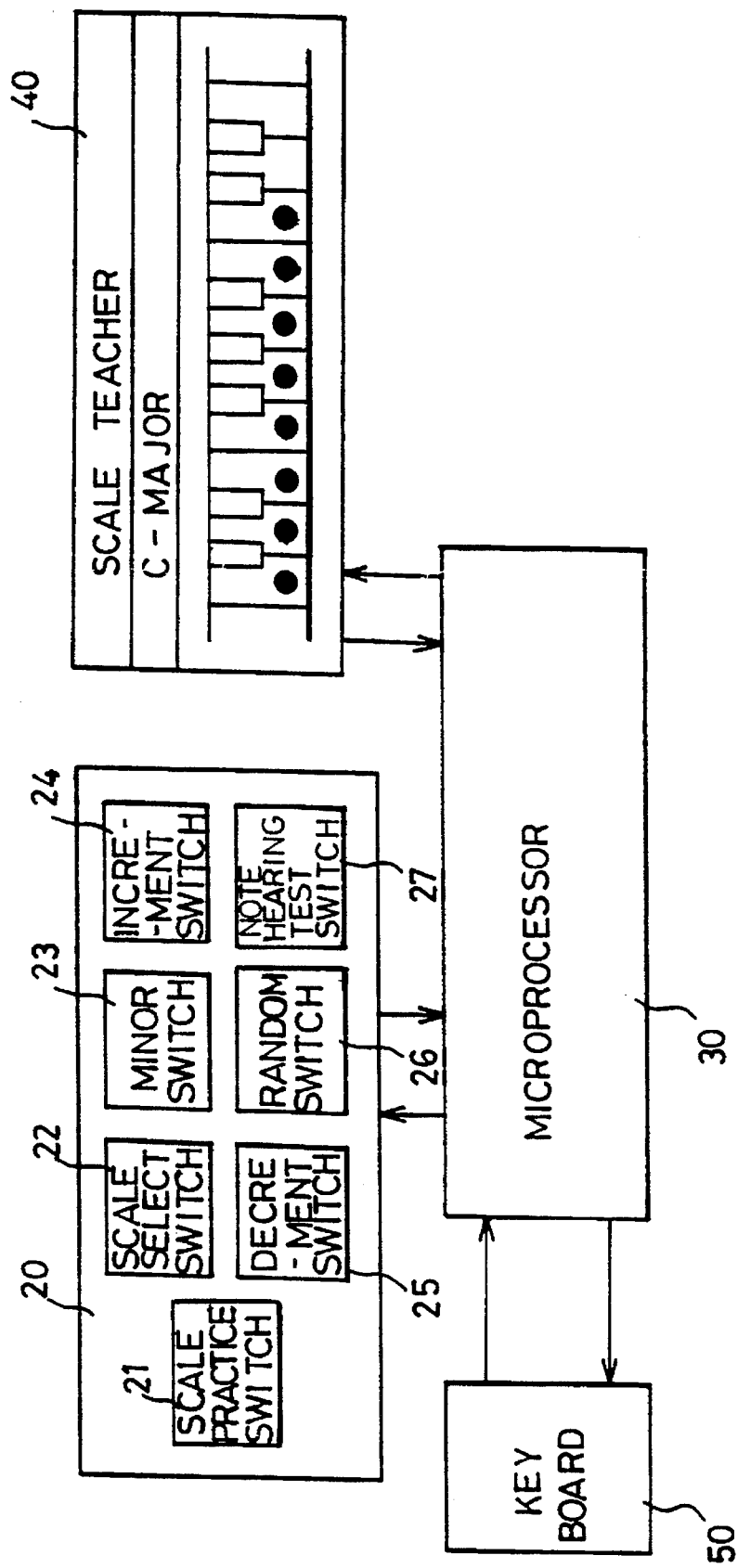
FIG. 3 is a block diagram of an apparatus for controlling scale practice of an electronic musical instrument in accordance with the present invention.

Referring to FIG. 3, there is shown a block diagram of an apparatus for controlling scale practice of an electronic musical instrument in accordance with the present invention. As shown in this drawing, the scale practice control apparatus comprises a function select switching section 20 for selecting a desired one of various functions of the electronic musical instrument according to a user's selection, a microprocessor 30 for outputting a control signal to perform the function selected by the function select switching section 20, a display unit 40 for displaying a sheet music of a tune selected according to the control signal from the microprocessor 30, and a keyboard 50 for allowing the user to play the electronic music instrument according to the sheet music displayed on the display unit 40.

The function select switching section 20 includes a scale practice switch 21 for selecting a scale practice mode, a scale select switch 22 for selecting a desired scale, a minor switch 23 for selecting a major and a minor of the scale selected by the scale select switch 22, an increment switch 24 for selecting a tune, notes of which are sequentially incremented, a decrement switch 25 for selecting a tune, notes of which are sequentially decremented, a random switch 26 for selecting a tune, notes of which are varied at random, and a note hearing test switch 27 for selecting a note hearing test mode.

The operation of the scale practice control apparatus with the above-mentioned construction in accordance with the present invention will hereinafter be described in detail with reference to FIGS. 3 to 6D.

Figure 4:
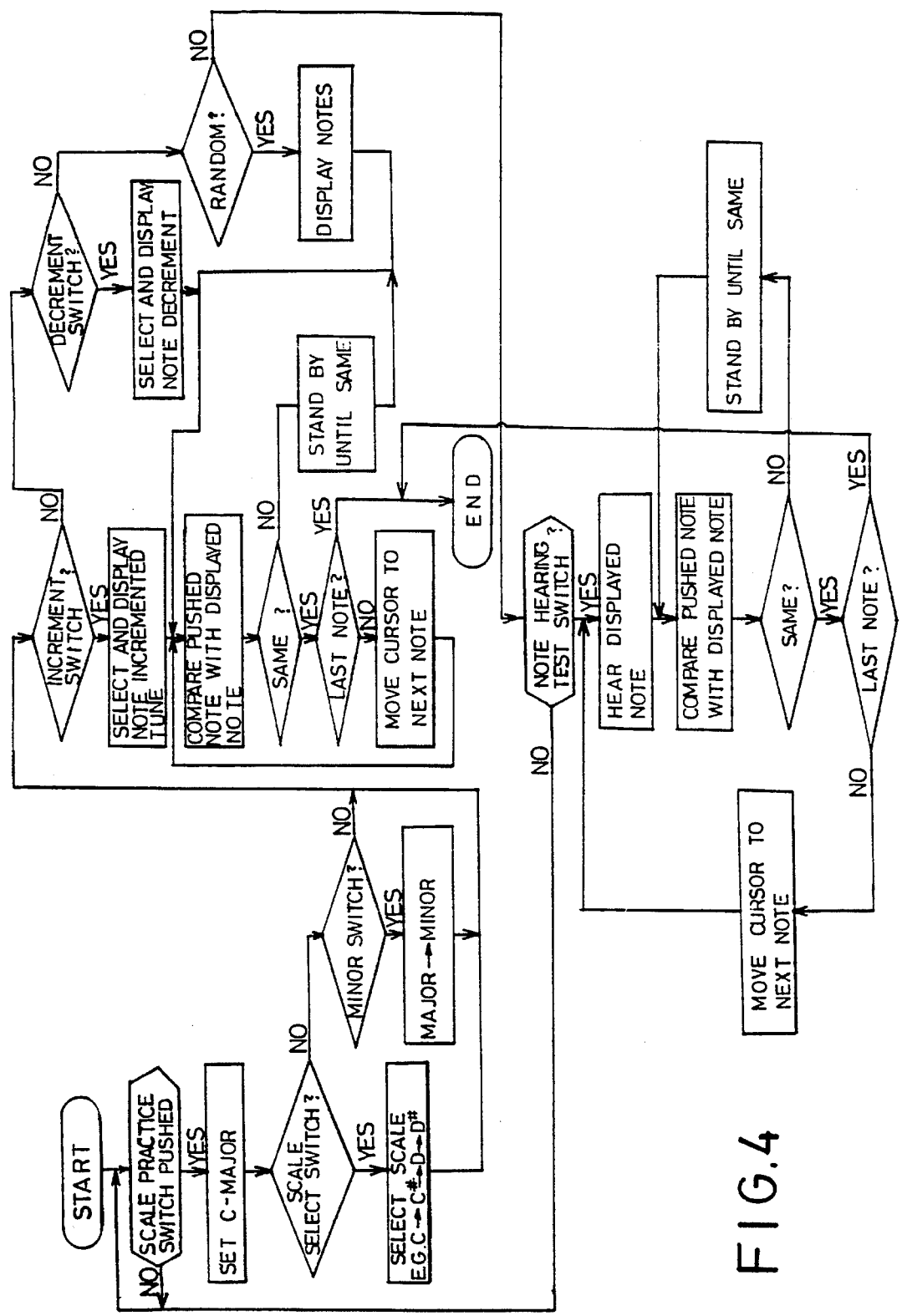
FIG. 4 is a flowchart illustrating a method of controlling the scale practice of the electronic musical instrument in accordance with the present invention.
Figure 5A:
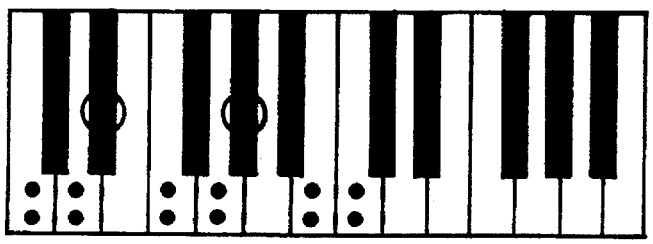
FIGS. 5A and 5B are views illustrating examples of keyboard forms displayed on a display unit in accordance with the present invention.
Figure 5B:
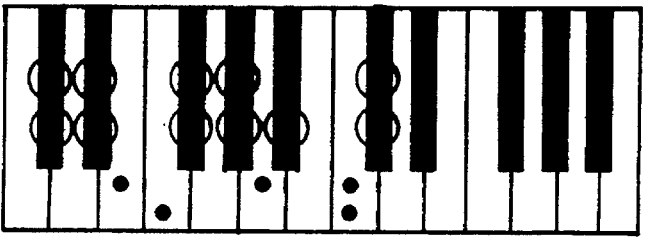

FIG. 4 is a flowchart illustrating a method of controlling the scale practice of the electronic musical instrument in accordance with the present invention, FIGS. 5A and 5B are views illustrating examples of keyboard forms displayed on the display unit 40 in accordance with the present invention and FIGS. 6A to 6D are views illustrating examples of sheet music displayed on the display unit 40 in accordance with the present invention.

First, the microprocessor 30 checks whether the scale practice switch 21 on the function select switching section 20 is pushed by the user. If it is checked that the scale practice switch 21 is pushed by the user, the microprocessor 30 sets an initial scale to a C-major. The C-major scale is displayed as shown in FIG. 5A on the display unit 40 under the control of the microprocessor 30.

Then, the microprocessor 30 checks whether the scale select switch 22 on the function select switching section 20 is selected by the user. If it is checked that the scale select switch 22 is selected by the user, scales are displayed on the display unit 40 in the order of C#, D, D#, F, F#, G, G#, A, A#, B, C . . . and one thereof is then selected. The selected scale is displayed on the display unit 40 as shown in FIG. 5B.

At this time, if the minor switch 23 on the function select switching circuit 20 is selected by the user, the major or minor of the selected scale is selected and then displayed on the display unit 40.

Upon completion of the selection of the scale and the major or minor thereof, the user selects a desired tune by operating the increment switch 24, the decrement switch 25 and the random switch 26 on the function select switching section 20.

Figure 6A:
FIGS. 6A to 6D are views illustrating examples of sheet music displayed on the display unit in accordance with the present invention.

Namely, if the increment switch 24 on the function select switching section 20 is pushed by the user, the tune with the notes sequentially incremented as shown in FIG. 6A is selected and the sheet music thereof is then displayed on the display unit 40. Also, a cursor is moved to the first note of the displayed sheet music. Then, the user pushes a key on the keyboard 50 corresponding to the first note of the displayed sheet music. The pushed note and the displayed note are applied to the microprocessor 30. The microprocessor 30 checks whether the pushed note and the displayed note are the same. If it is checked that the pushed note and the displayed note are the same, the cursor is moved to the next note. On the contrary, if the pushed note and the displayed note are not the same, the cursor is not moved to the next note.

Figure 6B:
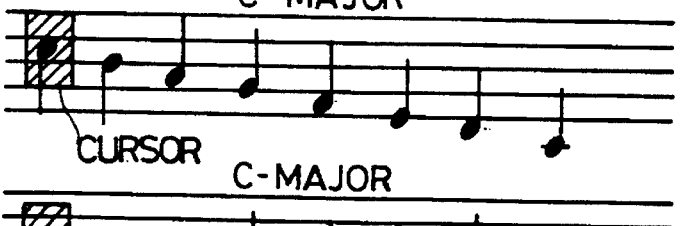

On the other hand, when the decrement switch 25 on the function select switching section 20 is pushed by the user, the tune with the notes sequentially decremented as shown in FIG. 6B is selected and the sheet music thereof is then displayed on the display unit 40. Also, the cursor is moved to the first note of the displayed sheet music. When the user pushes a key on the keyboard 50 corresponding to the first note of the displayed sheet music, the pushed note and the displayed note are applied to the microprocessor 30. The microprocessor 30 checks whether the pushed note and the displayed note are the same. If it is checked that the pushed note and the displayed note are the same, the cursor is moved to the next note. On the contrary, if the pushed note and the displayed note are not the same, the cursor is not moved to the next note.

Figure 6C:
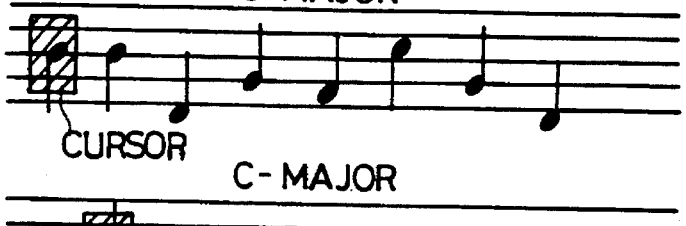

Also, if the random switch 26 on the function select switching section 20 is pushed by the user, the tune with the notes varied at random as shown in FIG. 6C is selected and the sheet music thereof is then displayed on the display unit 40. The cursor is moved to the first note of the displayed sheet music. The user pushes a key on the keyboard 50 corresponding to the first note of the displayed sheet music, the pushed note and the displayed note are applied to the microprocessor 30. The microprocessor 30 checks whether the pushed note and the displayed note are the same. If it is checked that the pushed note and the displayed note are the same, the cursor is moved to the next note. On the contrary, if the pushed note and the displayed note are not the same, the cursor is not moved to the next note.

Figure 6D:
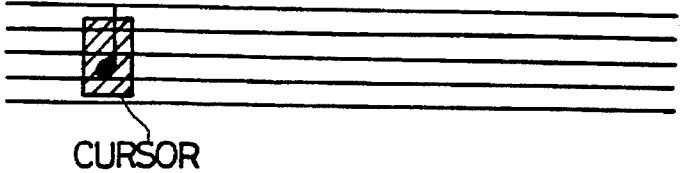

In the case where the note hearing test switch 27 on the function select switching section 20 is selected by the user, a sheet music with a random note for the test is displayed on the display unit 40 as shown in FIG. 6D. The random note of the sheet music displayed on the display unit 40 is hidden by the cursor so that it cannot be seen by the user. Under this condition, the random note is given to the user.

Then, the user pushes a key on the keyboard 50 corresponding to the given note. The pushed note and the random note displayed on the display unit 40 are applied to the microprocessor 30. The microprocessor 30 checks whether the pushed note and the displayed random note are the same. If it is checked that the pushed note and the displayed random note are the same, the microprocessor 30 informs the user that the pushed note and the displayed random note are the same. On the contrary, if the pushed note and the displayed random note are not the same, the microprocessor 30 remains at a standby state until the same note is pushed by the user.

As apparent from the above description, according to the present invention, the tunes with the regular notes and the random notes are variously stored in the microprocessor for the scale practice. This has the effect of increasing the practice effect. Also, it is possible to perform the note hearing test. In this note hearing test, the note is first given to the user and it is then checked whether a key on the keyboard pushed by the user corresponds to the note.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling scale practice of an electronic musical instrument, having function select switching means for selecting a desired one of various functions of the electronic musical instrument according to a user's selection, said function select switching means comprising:

a scale practice switch for selecting a scale practice mode;

a scale select switch for selecting a desired scale;

a minor switch for selecting a major or minor of the scale selected by said scale select switch;

an increment switch for selecting a tune, notes of which are sequentially incremented;

a decrement switch for selecting a tune, notes of which are sequentially decremented;

a random switch for selecting a tune, notes of which are varied at random; and a note hearing test switch for selecting a note hearing test mode.

2. A method of controlling scale practice of an electronic musical instrument, comprising the steps of:

(a) checking whether a scale practice switch on function select switching means is selected by the user, checking, if it is checked that said scale practice switch is pushed by the user, whether a scale select switch on said function select switching means is selected by the user, varying sequentially scales if it is checked that said scale select switch is selected by the user, displaying the sequentially varied scales on a display unit and displaying one of the sequentially varied scales selected by the user on said display unit;

(b) checking after performing said step (a) whether a minor switch on said function select switching means is selected by the user and setting a minor or major of the scale selected at said step (a) if it is checked that said minor switch is selected by the user;

(c) checking after performing said step (b) whether an increment or decrement switch and a random switch on said function select switching means are selected by the user, selecting tunes with sequentially incremented or decremented notes and randomly varied notes if it is checked that said increment or decrement switch and said random switch are selected by the user, displaying the selected tunes on said display unit according to the scale selected at said step (b), comparing the first one of the notes of the presently displayed tune with a note on a keyboard pushed by the user and proceeding to the next note only when the first note and the note pushed by the user are the same as a result of the comparison; and (d) checking whether a note hearing test switch on said function select switching means is selected by the user, giving a random note to the user if it is checked that said note hearing test switch is selected by the user, comparing the random note with a note on said keyboard pushed by the user and proceeding to the next note only when the random note and the note pushed by the user are the same as a result of the comparison.

3. A method of controlling scale practice of an electronic musical instrument, as set forth in claim 2, wherein said step (c) includes the steps of:

(c-1) selecting the tune with the sequentially incremented notes if it is checked that said increment switch is selected by the user;

(c-2) displaying the tune selected at said step (c-1) on said display unit according to the scale selected at said step (b); and (c-3) checking whether the first one of the notes of the tune displayed at said step (c-2) is the same as that on said keyboard pushed by the user and moving a cursor to the next note if it is checked that the first note and the note pushed by the user are the same; and (c-4) maintaining said cursor naturally if it is checked that the first note and the note pushed by the user are not the same, so that the operation does not proceed to the next note.

4. A method of controlling scale practice of an electronic musical instrument, as set forth in claim 3, wherein said step (c) includes the steps of:

(c-5) selecting the tune with the sequentially decremented notes if is checked that said decrement switch is selected by the user; and (c-6) performing repeatedly said steps (c-2) to (c-4) if the tune with the sequentially decremented notes is selected at said step (c-5).

5. A method of controlling scale practice of an electronic musical instrument, as set forth in claim 3, wherein said step (c) includes the steps of:

(c-5) selecting the tune with the randomly varied notes if is checked that said random switch is selected by the user; and (c-6) performing repeatedly said steps (c-2) to (c-4) if the tune with the randomly varied notes is selected at said step (c-5).

* * * * *